(12) United States Patent
Sakakibara

(10) Patent No.: US 11,919,461 B2
(45) Date of Patent: Mar. 5, 2024

(54) VEHICLE DEVICE

(71) Applicant: DENSO CORPORATION, Kariya (JP)

(72) Inventor: Yoji Sakakibara, Kariya (JP)

(73) Assignee: DENSO CORPORATION, Kariya (JP)

( * ) Notice: Subject to any disclaimer, the term of this patent is extended or adjusted under 35 U.S.C. 154(b) by 300 days.

(21) Appl. No.: 17/531,031

(22) Filed: Nov. 19, 2021

(65) Prior Publication Data

US 2022/0073018 A1 Mar. 10, 2022

Related U.S. Application Data

(63) Continuation of application No. PCT/JP2020/018676, filed on May 8, 2020.

(30) Foreign Application Priority Data

May 22, 2019 (JP) .................................. 2019-095984

(51) Int. Cl.
| | | |
|---|---|---|
| *B60R 16/02* | (2006.01) | |
| *B60R 16/023* | (2006.01) | |
| *B60R 16/03* | (2006.01) | |
| *G06F 8/65* | (2018.01) | |
| *G06F 16/182* | (2019.01) | |

(52) U.S. Cl.
CPC .......... *B60R 16/0231* (2013.01); *B60R 16/03* (2013.01); *G06F 8/65* (2013.01); *G06F 16/182* (2019.01)

(58) Field of Classification Search
CPC ....... B60R 16/0231; B60R 16/03; G06F 8/65; G06F 16/182
See application file for complete search history.

(56) References Cited

U.S. PATENT DOCUMENTS

| | | |
|---|---|---|
| 6,374,268 B1 | 4/2002 | Testardi |
| 2007/0260867 A1 | 11/2007 | Ethier et al. |
| 2017/0255459 A1 | 9/2017 | Tanimoto et al. |
| 2017/0337212 A1* | 11/2017 | Hayasaka ............. G06F 16/182 |

FOREIGN PATENT DOCUMENTS

| | | |
|---|---|---|
| JP | H11-327981 A | 11/1999 |
| JP | 2002278782 A | 9/2002 |
| JP | 2007299404 A | 11/2007 |
| JP | 2009-015428 A | 1/2009 |
| JP | 2017156908 A | 9/2017 |

* cited by examiner

*Primary Examiner* — Michael V Kerrigan
(74) *Attorney, Agent, or Firm* — Harness, Dickey & Pierce, P.L.C.

(57) ABSTRACT

A vehicle device includes a non-volatile memory and a volatile memory. The non-volatile memory stores, as read-only data, a system image. The system image read from the non-volatile memory is extracted in the volatile memory. The vehicle device generates a symbolic link. The vehicle device accesses a file included in the system image.

5 Claims, 4 Drawing Sheets

VEHICLE DEVICE

CROSS REFERENCE TO RELATED APPLICATIONS

The present application is a continuation application of International Patent Application No. PCT/JP2020/018676 filed on May 8, 2020, which designated the U.S. and claims the benefit of priority from Japanese Patent Application No. 2019-095984 filed on May 22, 2019. The entire disclosures of all of the above applications are incorporated herein by reference.

TECHNICAL FIELD

The present disclosure relates to a vehicle device.

BACKGROUND

A method for shortening time required to complete booting of an operating system has been proposed. For example, a system image used by a control unit is stored in a non-volatile memory such as a so-called flash ROM, and the system image is extracted to a volatile memory such as a main memory at the time of booting. Hereinafter, an operating system will be referred to as an OS.

SUMMARY

The present disclosure provides a vehicle device. The vehicle device includes a non-volatile memory and a volatile memory. The non-volatile memory stores, as read-only data, a system image. The system image read from the non-volatile memory is extracted in the volatile memory. The vehicle device generates a symbolic link. The vehicle device accesses a file included in the system image.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
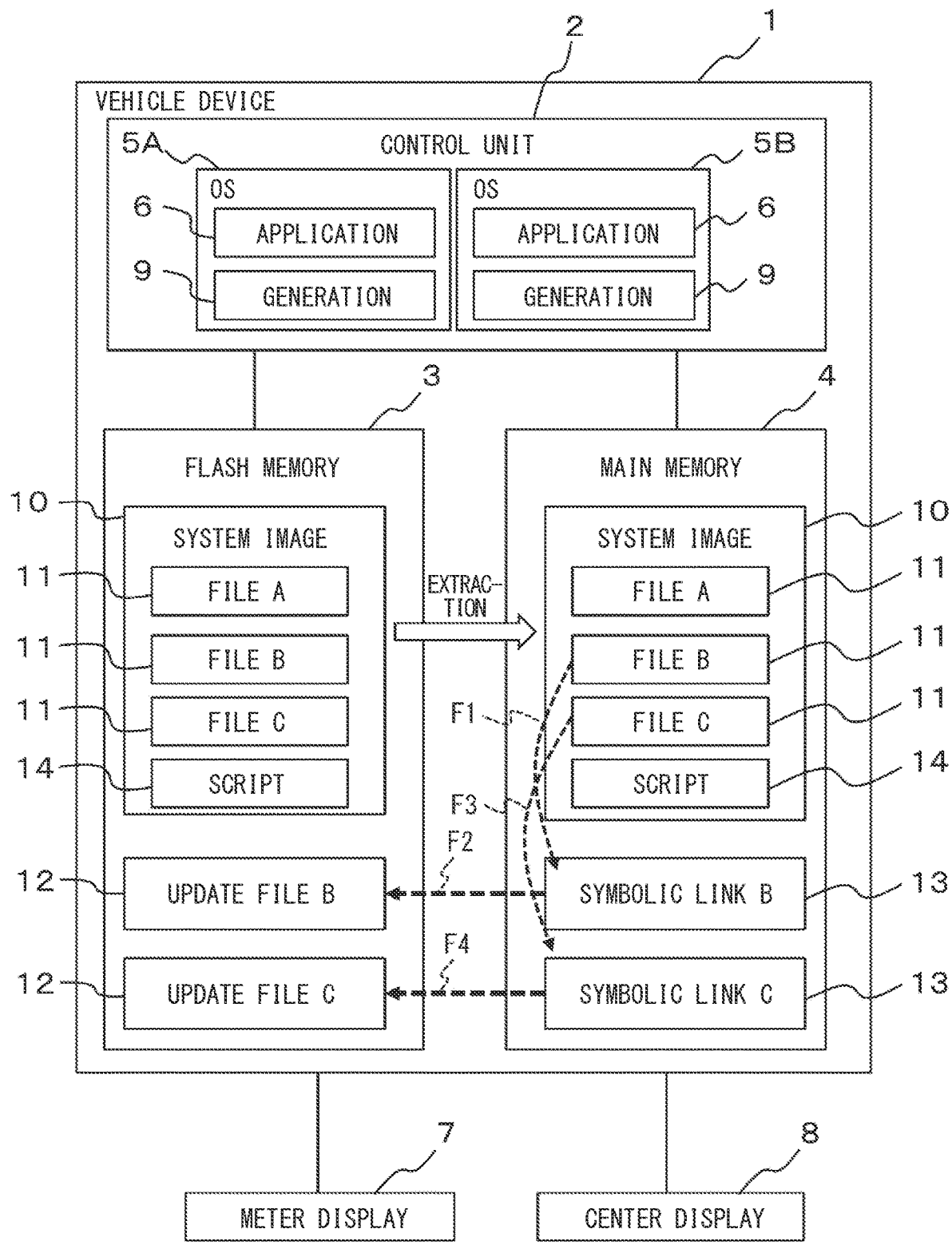
FIG. 1 is a diagram schematically showing a configuration of a vehicle device according to a first embodiment.

In recent years, a vehicle device integrates multiple functions with an OS equipped. Thus, it is considered that start-up of the vehicle device can be speeded up by adopting the system image.

However, the system image is read-only and stored in a non-volatile memory, and is still read-only even when it is extracted in a main memory. For example, even when it is necessary to update or replace a part of files in the system image, the entire system image needs to be reconstructed.

The present disclosure provides a vehicle device that enables updating a file on a file-by-file basis without reconstructing an entire system image.

An exemplary embodiment of the present disclosure provides a vehicle device that includes a control unit, a non-volatile memory, a volatile memory, and a generation unit. The non-volatile memory is configured to store, as read-only data, a system image used by the control unit. The volatile memory in which the system image read from the non-volatile memory is extracted. The generation unit is configured to generate a symbolic link that causes an actual access destination for the control unit when the control unit accesses a file included in the system image to be an update file stored in a rewritable area.

In the exemplary embodiment of the present disclosure, when the control unit accesses the file included in the system image, the actual access destination is the update file stored in the rewritable area. Thus, the configuration can perform the similar control in a state where the file is substantially rewritten.

Embodiments are described below with reference to the drawings. The configurations that are substantially common in each embodiment will be described with the same reference numerals.

First Embodiment

A first embodiment will be described below. As shown in FIG. 1, a vehicle device 1 attached to a vehicle includes a control unit 2, a flash memory 3, a main memory 4, and the like. The control unit 2 is composed of a so-called microprocessor having a CPU or the like (not shown). In this control unit 2, for example, a virtual environment in which two operating systems 5 operate is constructed. Hereinafter, the operating system 5 will be referred to as an OS 5.

In the case of this embodiment, an OS 5A employs a so-called real-time OS, and an OS 5B employs a general-purpose OS. On each OS 5, an application 6 for realizing various functions of the vehicle device 1 operates. The application 6 that operates on the OS 5A performs, for example, a process of presenting information related to traveling and safety of the vehicle on a meter display 7. Further, the application 6 that operates on the OS 5B performs multimedia processing such as a navigation screen on a center display 8, for example.

That is, the vehicle device 1 performs a collection of processes that have been conventionally performed using multiple devices. Although one application 6 is shown in FIG. 1 for simplification, multiple applications 6 for realizing multiple functions operate on each OS 5. Further, each OS 5 may operate on a hypervisor (not shown), or the OS 5B may operate on a hypervisor function provided in the OS 5A.

Further, a generation unit 9 is provided on each OS 5. Although the details of the generation unit 9 will be described later, when the control unit 2 accesses a file 11 included in a system image 10, the generation unit 9 generates a symbolic link 13 for causing the actual access destination to be an update file 12 stored in a rewritable area such as the flash memory 3.

These programs such as the OS 5 and the application 6 can operate by reading the system image 10 stored in the flash memory 3 and extracting the system image 10 in the main memory 4. At this time, the system image 10 includes a kernel of the OS5, the application 6, a driver, and the like.

The system image 10 is an image of a so-called file system used by the control unit 2. The system image 10 includes multiple files 11 and a script 14 described later. Although FIG. 1 shows three files 11A, 11B, and 11C, the number of files 11 is not limited to three. Further, reading of the system image 10 from the flash memory 3 at the time of booting and extraction of the read system image 10 into the main memory 4 are performed by a boot loader (not shown).

The flash memory 3 is composed of, for example, a non-volatile memory such as an Embedded Multi Media Card. Although the flash memory 3 itself is electrically rewritable, the system image 10 is read-only and is accessed from the control unit 2. That is, the flash memory 3 stores the system image 10 used by the control unit 2 exclusively for reading. Further, the flash memory 3 secures an area for storing data other than the system image 10, for example, a boot loader and an update file 12 described later. The update file 12 is rewritable.

The main memory 4 is a so-called RAM, and is composed of a volatile memory. The system image 10 read from the flash memory 3 is extracted in the main memory 4. The extracted system image 10 is read-only and is accessed from the control unit 2. In other words, the system image 10 is not capable of updating each file 11 even when the system image 10 is extracted in the main memory 4.

Next, the effects of the configuration described above will be explained.

The vehicle device 1 operates the OS 5 as described above, and multiple functions are integrated. At this time, it is considered that the start-up of the vehicle device 1 can be speeded up by adopting the system image 10.

On the other hand, the system image 10 is read-only even when it is extracted in the main memory 4. Therefore, for example, even when it is necessary to update or replace a part of the files 11 in the system image 10, the entire system image 10 needs to be reconstructed. In the vehicle device 1 in which various functions are integrated, it is necessary to check the operation of each function at the time of development. For example, even when one parameter is changed, a reconstruction of the entire system image 10 is necessary, and there was a difficulty that the efficiency at the time of development would be significantly reduced.

In the vehicle device 1, it is possible to update each file 11 without reconstructing the entire system image 10 as follows. Hereinafter, the sequence at the time of starting the vehicle device 1 will be described. In the following, for the sake of simplification of the description, the vehicle device 1 will be mainly described.

Figure 2:
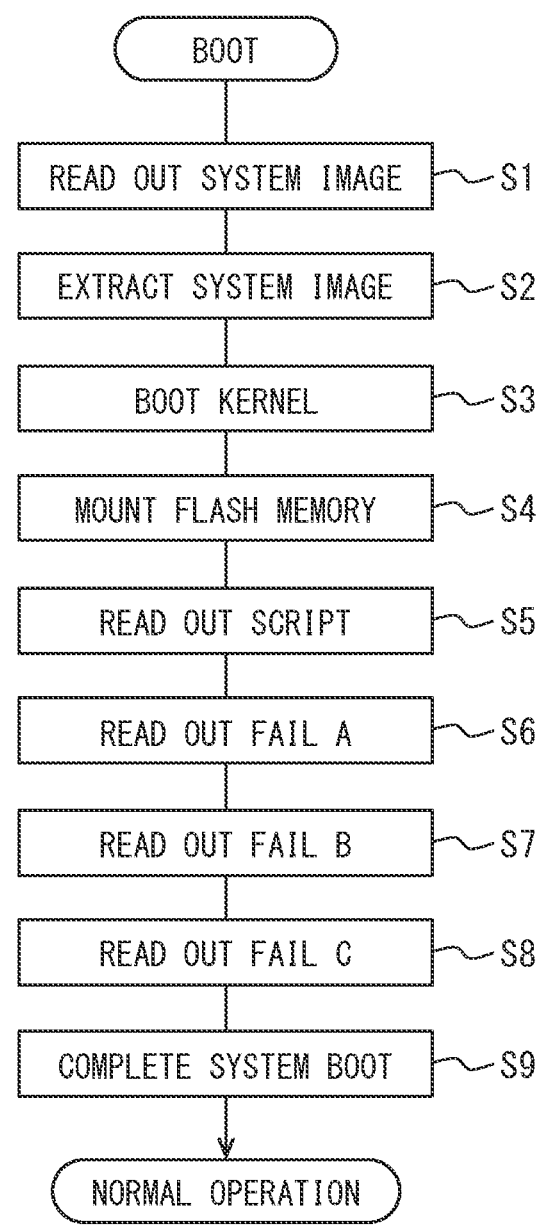
FIG. 2 is a diagram showing an example of a sequence at booting.

As shown in FIG. 2, when the vehicle device 1 is activated, the system image 10 is read from the flash memory 3 in S1 and extracted to the main memory 4 in S2. Then, the vehicle device 1 boots the kernel of the OS5 in S3 by using the extracted system image 10. When the kernel boots, the vehicle device 1 gains access to basic devices such as flash memory. Therefore, the vehicle device 1 mounts the flash memory 3 in S4. The mount is a process for causing the flash memory 3 to be accessible from the OS 5.

Subsequently, the vehicle device 1 reads the script 14 in S5. This script 14 is a program that generates a symbolic link 13 of the file 11 to be updated, and is incorporated in the system image 10 in advance. For example, since it is considered that the developer knows the file 11 to be updated, the developer is capable of generating the script 14 targeting the file 11. Then, if the system image 10 incorporating the script 14 is first constructed, the reconstruction of the system image 10 is basically unnecessary after that.

As shown in FIG. 1, it is assumed that, among the files 11A, 11B and 11C included in the system image 10, the files 11B and 11C are the update targets. At this time, the script 14 describes a program for generating the symbolic link 13 of the file 11B and the file 11C.

Since the description of the script 14 and the creation of the symbolic link 13 are general techniques, detailed description thereof will be omitted. However, the script 14 describes that the actual access destination when accessing the file 11B of the system image 10 is the update file 12B, and the actual access destination when accessing the file 11C of the system image 10 is the update file 12C.

Then, the vehicle device 1 generates each symbolic link 13B and symbolic link 13C according to the description. As a result, when accessing the file 11B, the symbolic link 13B is referred to as shown by the arrow F1, and the actual access destination becomes the update file 12B as shown by the arrow F2.

Similarly, when accessing the file 11C, the symbolic link 13C is referred to as shown by the arrow F3, and the actual access destination becomes the update file 12C as shown by the arrow F4. The control unit 2 may refer to the original file 11 included in the system image 10 when the update file 12 indicated by the symbolic link 13 does not exist.

Subsequently, the vehicle device 1 reads each file 11. At this time, in S6, for example, the vehicle device 1 reads the file 11A from the system image 10 since the symbolic link 13 is not generated for the file 11A.

On the other hand, the access destination of the file 11B in which the symbolic link 13 is generated is the update file 12B, thus, in S7, the vehicle device 1 reads the update file 12B stored in the rewritable area for the file 11B. Similarly, in S8, the vehicle device 1 also reads the update file 12C stored in the rewritable area for the file 11C in which the symbolic link 13 is generated.

When the vehicle device 1 reads all the required files 11, the vehicle device 1 transitions to the normal operation since the system startup is completed in S9.

As described above the vehicle device 1 sets the actual access destination of the file 11 to be updated, among the files 11 included in the system image 10, to the file 12 stored in the rewritable area by generating the symbolic link 13. This configuration can rewrite the file 11B and the file 11C in a pseudo manner without rebuilding the system image 10. Further, even if the vehicle device 1 is restarted, the update file 12 is kept. Thus, the update contents can be maintained.

According to the vehicle device 1 described above, the following effects can be achieved.

The vehicle device includes the control unit 2, the flash memory 3, the main memory 4, and the generation unit 9. The flash memory 3 is provided by a non-volatile memory, and stores, as read-only data, a system image 10 used by the control unit 2. The main memory 4 is provided by a volatile memory in which the system image 10 read from the flash memory 3 is extracted. The generation unit 9 generates the symbolic link 13 that is accessed instead of the file 11 included in the system image 10 and the symbolic link 13 is for the update file 12 stored in a rewritable area.

With such a configuration, the access destination from the control unit 2, that is, the OS 5 is set to the rewritable update file 12, and the file 11 included in the system image 10 can be updated in a pseudo manner by updating the update file 12. That is, it is possible to perform the same control as in the state where the file 12 is rewritten. Therefore, it is possible to update each file 11 without reconstructing the entire system image 10.

In addition, it is expected that the file 11 will need to be updated many times during development, but since it is possible to update each file 11 without reconstructing the entire system image 10, the efficiency of development is greatly improved.

Further, if the file 11 does not need to be updated, the symbolic link 13 may be deleted, so that the original file 11 can be easily referred to.

Further, the update file 12 is stored in the rewritable flash memory 3. Therefore, even when it is necessary to restart the vehicle device 1, the update file 12 and its updated contents can be maintained.

Further, the system image 10 includes the script 14 for generating the symbolic link 13 of the update file 12, and the generation unit 9 stores the update file 12 and generates the symbolic link 13 according to the script 14. As a result, the update file 12 can be used from the time when the vehicle device 1 is started. Therefore, for example, it is extremely significant for debugging during development.

Further, the system image 10 constructs a virtual environment in which multiple operating systems 5 operate on the control unit 2. In the case of a virtualized environment, a wide variety of functions are implemented, and it is expected that the number of files 11 that need to be updated will increase accordingly. Even in such a case, since the update can be performed in each file 11 without rebuilding the entire system image 10, the efficiency of development can be dramatically improved.

Second Embodiment

Next, a second embodiment will be described. In the second embodiment, a method of storing the script 14 different from that of the first embodiment and a method of adding the update file 12 during normal operation will be described.

In the first embodiment, an example of incorporating the script 14 into the system image 10 has been described.

Figure 3:
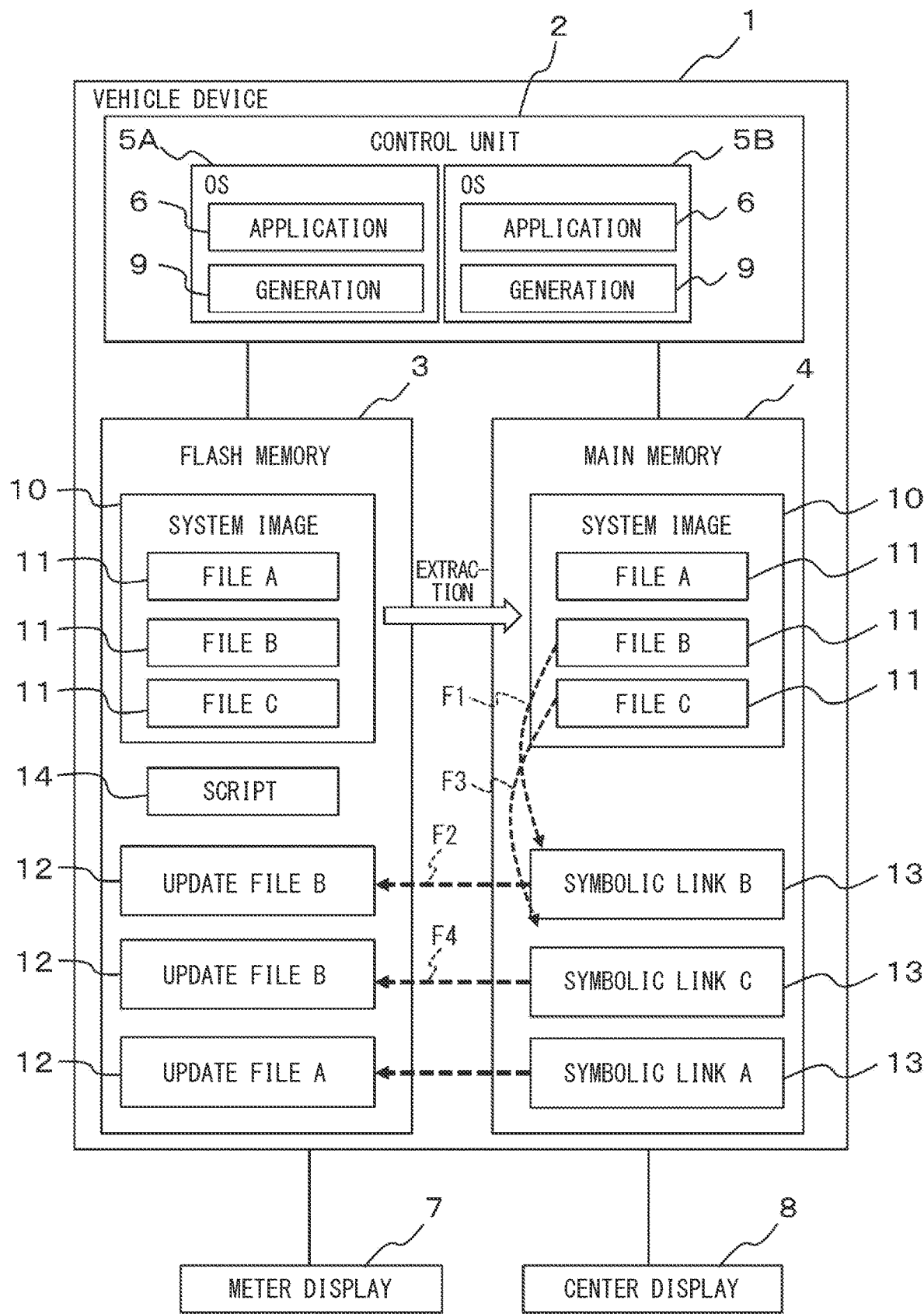
FIG. 3 is a diagram schematically showing a configuration of a vehicle device according to a second embodiment.
Figure 4:
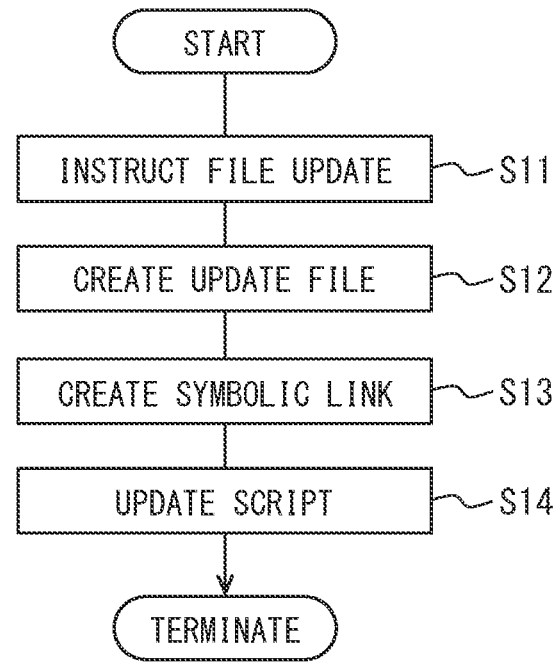
FIG. 4 is a diagram showing an example of a sequence during normal operation.

On the other hand, in the present application, a vehicle device 1 as shown in FIG. 3 stores the script 14 in the flash memory 3 in a rewritable manner separately from the system image 10. Then, as shown in FIG. 4, when the vehicle device 1 receives an instruction to update the file 11 from the control unit 2 in S11 during normal operation, the vehicle device 1 generates the update file 12 on the flash memory 3 in S12. For example, the vehicle device 1 generates an update file 12A in the flash memory 3. In this case, the prototype of the update file 12A can be generated by simply copying the file 11A included in the system image 10 to the flash memory 3.

Subsequently, the vehicle device 1 generates the symbolic link 13A for the update file 12A in S13, and updates the script 14 in S14. As a result, the file 11 that needs to be newly updated can be pseudo-updated.

As described above, the configuration stores the script 14 that generates the symbolic link 13 of the update file 12 in the flash memory 3, stores the update file 12 and generates the symbolic link 13A according to the script 14, and then updates the script 14 in response to the instruction from the control unit 2. Even with this configuration, it is possible to obtain the same effect as that of the first embodiment, such as being able to update each file 11 without reconstructing the entire system image 10.

Further, since the script 14 is stored in the flash memory 3, the data is not erased even if the vehicle device 1 is restarted. Further, the method of incorporating the script 14 into the system image 10 to generate the symbolic link 13B or the like, as described in the first embodiment, may be incorporated to the method of storing the script 14 in the flash memory 3 to add or delete the file 11 to be updated during the operation of the control unit 2, as described in the second embodiment.

In each embodiment, the efficiency at the time of development has been focused on, but the method described in each embodiment can be adopted for updating the file 11 after commercialization. Further, by adopting the method described in each embodiment for the so-called firmware update, even if there is a failure, the system image 10 stored in the flash memory 3 remains as it is. Thus, the configuration can inhibit the vehicle device 1 from not starting.

Although the present disclosure has been described in accordance with the embodiments, it is understood that the present disclosure is not limited to such embodiments and configurations. The present disclosure also includes various modifications and modifications within an equivalent range. In addition, various combinations and forms, and further, other combinations and forms including only one element, or more or less than these elements are also within the sprit and the scope of the present disclosure.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be performed by the computer.

What is claimed is:

1. A vehicle device comprising:
   a control unit;
   a non-volatile memory configured to store, as read-only data, a system image used by the control unit;
   a volatile memory in which the system image read from the non-volatile memory is extracted as read-only data; and
   a generation unit configured to generate a symbolic link that causes an actual access destination for the control unit when the control unit accesses a file included in the system image to be an update file stored in a rewritable area, wherein
   the non-volatile memory is rewritable, and
   the update file is stored in the non-volatile memory.

2. The vehicle device according to claim 1, wherein
   the system image includes a script for generating the symbolic link of the update file, and
   the generation unit, according to the script, stores the update file and generates the symbolic link.

3. The vehicle device according to claim 1, wherein
   the non-volatile memory stores a script for generating the symbolic link of the update file, and
   the generation unit, according to the script, stores the update file and generates the symbolic link, and updates the script in response to an instruction from the control unit.

4. The vehicle device according to claim 1, wherein
   the system image constructs a virtual environment in which a plurality of operating systems operate on the control unit.

5. A vehicle device comprising:
   a processor configured to generate a symbolic link;

a non-volatile memory configured to store, as read-only data, a system image used by the processor; and a volatile memory in which the system image read from the non-volatile memory is extracted as read-only data, wherein when the processor accesses a file included in the system image, the processor accesses, instead of the file, an update file stored in a rewritable area of the non-volatile memory by referring to the symbolic link, and the non-volatile memory is rewritable.

* * * * *